United States Patent
Bozzone et al.

(10) Patent No.: US 7,019,491 B2
(45) Date of Patent: Mar. 28, 2006

(54) METHOD AND APPARATUS FOR INDICATION OF A CHARGING CONDITION

(75) Inventors: Stephen O. Bozzone, Lauderhill, FL (US); Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 140 days.

(21) Appl. No.: 10/820,920

(22) Filed: Apr. 8, 2004

(65) Prior Publication Data

US 2005/0225294 A1 Oct. 13, 2005

(51) Int. Cl.
*H02J 7/00* (2006.01)

(52) U.S. Cl. .............................. 320/112; 320/DIG. 18

(58) Field of Classification Search ................ 320/112, 320/132, DIG. 18, 162; 429/7; 307/150; 340/500, 511, 538.16, 636.1, 691.1
See application file for complete search history.

(56) References Cited

U.S. PATENT DOCUMENTS 5,189,400 A 2/1993 Schultz .................... 340/636 J
5,594,319 A * 1/1997 Thandiwe ...................... 429/7
6,072,250 A * 6/2000 Thandiwe et al. .......... 307/150
2005/0134215 A1 6/2005 Bozzone et al.

OTHER PUBLICATIONS www.group2000.net/index1.htm - "Charger 2000".

* cited by examiner

*Primary Examiner*—Pia Tibbits
(74) *Attorney, Agent, or Firm*—Larry G. Brown

(57) ABSTRACT

The invention concerns an apparatus (100) for indication of a charging condition. The apparatus includes an indication circuit (126) having at least one electromagnet (120) and a charge control circuit (128) for controlling charging current to a portable device (110). The indication circuit causes the apparatus to electromagnetically engage the portable device and the charge control circuit provides charging current to the portable device during the engagement. The indication circuit also causes the apparatus to electromagnetically decouple the portable device when the portable device is charged to a predetermined level to permit a user to remove the portable device from the apparatus.

24 Claims, 9 Drawing Sheets

METHOD AND APPARATUS FOR INDICATION OF A CHARGING CONDITION

BACKGROUND OF THE INVENTION

1. Field of the Invention

This invention relates in general to energy management and more particularly to methods for charging batteries.

2. Description of the Related Art

Portable electronic devices, such as cellular telephones and personal digital assistants, have become very popular in today's marketplace. Virtually all of these devices receive their power from a portable, rechargeable battery. For some models, the portable electronic device is coupled to a charging unit, such as a desktop charger, to allow the battery of the portable electronic device to be recharged.

Presently, when a battery is fully charged, there are several visual indicators that may be employed to provide notice to a user that the battery is ready for use. For example, many portable electronic devices, such as cellular telephones, display a message that indicates that the charging process is complete. Alternatively, some of the charging units are equipped with a light emitting diode (LED) to signal when the battery is charged to capacity. Such indicators may be useful to many users; however, some users may suffer from poor or impaired vision, which may prevent them from determining when the portable electronic device is ready for use.

SUMMARY OF THE INVENTION

The present invention concerns an apparatus for indication of a charging condition. The apparatus includes an indication circuit having at least one electromagnet and a charge control circuit for controlling charging current to a portable device. The indication circuit causes the apparatus to electromagnetically engage the portable device, and the charge control circuit provides charging current to the portable device during the engagement. In addition, the indication circuit causes the apparatus to electromagnetically decouple the portable device when the portable device is charged to a predetermined level to permit a user to remove the portable device from the apparatus.

The apparatus can also include at least one contact. The apparatus contact can electrically couple to a contact of the portable device when the apparatus electromagnetically engages the portable device. In one arrangement, the indication circuit can provide an engaging current to the electromagnet. The engaging current can cause the electromagnet to generate at least one of an attractive magnetic field and a repulsive magnetic field. As an example, when the electromagnet generates an attractive magnetic field, the electromagnet can attract at least one of a non-magnetized, metallic component of the portable device and an opposite pole magnet of the portable device. Alternatively, when the electromagnet generates a repulsive magnetic field, the electromagnet can repel a like pole magnet of the portable device.

In another arrangement, the electromagnet and the contacts can be positioned on a first surface of the apparatus. Also, the electromagnet can be positioned on a first surface of the apparatus, and the contacts can be positioned on a second surface of the apparatus in which the second surface can oppose the first surface.

In one embodiment of the invention, the electromagnet can generate a magnetic field when the apparatus electromagnetically engages the portable device, and the magnetic field can decrease in strength as the portable device is charged towards the predetermined level. As an example, the indication circuit and the charge control circuit can be in series. In another embodiment, the electromagnet can generate a magnetic field when the apparatus electromagnetically engages the portable device, and the magnetic field can remain at a substantially fixed level as the portable device is charged towards the predetermined level. In this arrangement, the indication circuit and the charge control circuit can be in parallel. The apparatus can also include a sensor for determining whether the portable device has been removed from the apparatus.

The present invention also concerns another apparatus for indication of a charging condition. The apparatus can include an indication circuit having at least one electromagnet and a charge control circuit for controlling charging current to a portable device. The indication circuit causes the apparatus to electromagnetically engage the portable device in a first position, and the charge control circuit can provide charging current to the portable device during the first position engagement. The indication circuit causes the apparatus to electromagnetically engage the portable device in a second position when the portable device is charged to a predetermined level such that the charge control circuit stops providing charging current to the portable device and a user is permitted to remove the portable device from the apparatus.

The present invention also concerns a portable device. The portable device includes at least one contact for electrically coupling to at least one corresponding contact on a charging unit and a magnetically susceptible component. The charging unit electromagnetically engages the magnetically susceptible component and provides a charging current to the portable device through the contacts of the portable device and the corresponding contacts of the charging unit during the engagement. In addition, the charging unit electromagnetically decouples the portable device when the portable device is charged to a predetermined level to permit a user to remove the portable device from the charging unit.

In one arrangement, the magnetically susceptible component can be a non-magnetized, metallic component or a magnet. As an example, the magnet of the portable device can be a like pole magnet with respect to an electromagnet in the charging unit such that the electromagnet can generate a repulsive magnetic field when the charging unit electromagnetically engages the portable device.

The present invention also concerns a method for indication of a charging condition. The method can include the steps of electromagnetically engaging a portable device to a charging unit such that the portable device is magnetically urged towards and secured to at least a portion of the charging unit, supplying charging current to the portable device and when the portable device is charged to a predetermined level, electromagnetically decoupling the portable device from the charging unit to permit a user to remove the portable device from the charging unit.

The method can also include the steps of providing an engaging current to at least one electromagnet of the charging unit. This step can cause the electromagnet to generate at least one of an attractive magnetic field and a repulsive magnetic field. Further, the charging unit can have at least one electromagnet, and the method can also include the steps of generating a magnetic field during the electromagnetically engaging step and decreasing the strength of the magnetic field as the portable device is charged towards the predetermined level. As an alternative, the method can further include the step of keeping the strength of the magnetic field at a substantially constant level as the portable device is charged towards the predetermined level.

In one arrangement, the method can include the steps of determining whether the portable device has been removed from the charging unit and in response to the portable device being removed from the charging unit, setting the charging unit to a predetermined charging configuration. In another arrangement, the electromagnetically engaging step can include magnetically urging and securing the portable device to the charging unit with an attractive magnetic field, and the electromagnetically decoupling step can include removing the attractive magnetic field. Alternatively, the electromagnetically engaging step can include magnetically urging and securing the portable device to the charging unit with a repulsive magnetic field, and the electromagnetically decoupling step can include removing the repulsive magnetic field.

The present invention also concerns another method for indication of a charging condition. The method includes the steps of electromagnetically engaging a portable device to a charging unit in a first position such that the portable device is magnetically urged towards and secured to at least a first portion of the charging unit, supplying charging current to the portable device and when the portable device is charged to a predetermined level, electromagnetically engaging the portable device to the charging unit in a second position such that the portable device is magnetically urged towards and secured to a second portion of the charging unit. When the portable device is in the second position, the charging current is stopped, and a user is permitted to remove the portable device from the charging unit.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
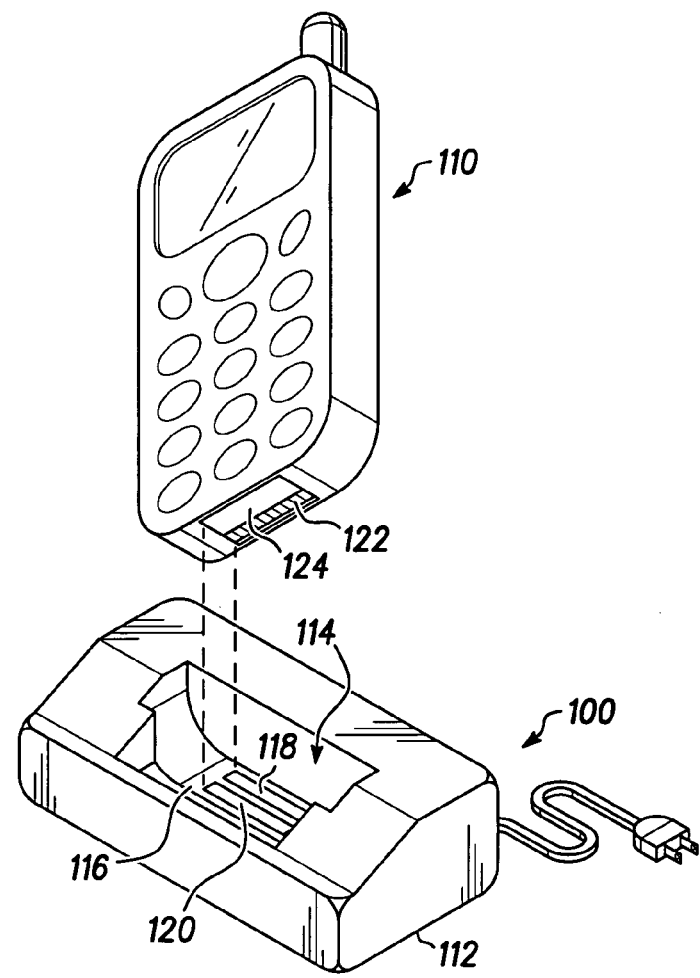
FIG. 1 illustrates a portable device and a charging apparatus in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring to FIG. 1, an apparatus 100 for indication of a charging condition is shown. In one embodiment of the invention, the apparatus 100 can be a charging unit for charging a portable device 110, such as a cellular telephone. When the portable device 110 is coupled to the apparatus 100, the apparatus 100 can provide charging current to the portable device 110. The apparatus 100 is not limited to charging cellular telephones, however, as the apparatus 100 can be used to charge any portable unit capable of receiving a charging current. As is known in the art, the apparatus 100 can be used to charge the portable device 110 to a predetermined level, such as a fully-charged level, as determined by the specifications of the portable device 110.

In one arrangement, the apparatus 100 can have a base 112 that can include a cavity 114 for receiving the portable device 110. The apparatus 100 can also include a first surface 116, on which one or more contacts 118 and one or more electromagnets 120 may be positioned. In addition, the portable device 110 may include one or more corresponding contacts 122 and one or more magnetically susceptible components 124. For purposes of the invention, a magnetically susceptible component can be any material that may be attracted or repelled by a magnetic field generated by the electromagnet 120. As an example, the magnetically susceptible component 124 can be a non-magnetized metal or a magnet. When the portable device 110 is coupled to the apparatus 100, the contacts 118 of the apparatus 100 can engage the contacts 122 of the portable unit 110, which can enable the apparatus 100 to provide a charging current to the portable unit 110.

In this example, the electromagnet 120 can generate a magnetic field that can attract the magnetically susceptible component 124 of the portable device 110. Here, the magnetically susceptible component 124 can be a non-magnetized metal or an opposite pole magnet as compared to the generated magnetic field. This attraction can help secure the portable device 110 to the apparatus 100 as the portable device 110 is being charged. Once the portable device 110 is charged to a predetermined level, the magnetic field generated by the electromagnet 120 can be removed, which can allow a user to easily remove the portable device 110 from the apparatus 100. This process, which will be further described below, can give a tactile indication as to the charging status of the portable device 110. That is, if a user attempts to remove the portable device 110 from the apparatus 100 before the portable device 110 is charged to the predetermined level, the user may find it difficult (if not impossible) to do so. Conversely, if the portable device 110 has been charged to a level above the predetermined level, the user will find it easy to remove the portable device 110 from the apparatus 100 because the generated magnetic field has been eliminated or at least substantially eliminated. It is understood that the invention is in no way limited to this particular example, as other embodiments are within contemplation of the inventive arrangements. Some of these alternative embodiments will be described below.

Figure 2:
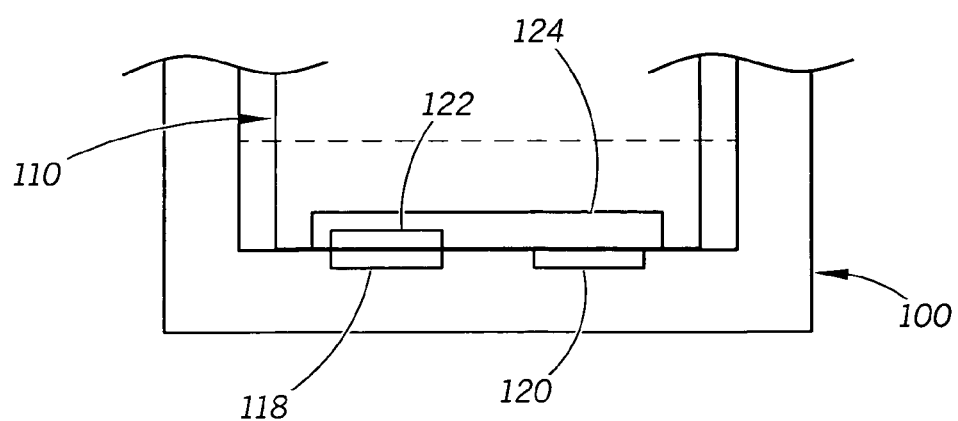
FIG. 2 illustrates a front-sectional view of a portion of the portable device and the charging apparatus of FIG. 1 in which the portable device is coupled to the charging apparatus in accordance with an embodiment of the inventive arrangements.

Referring to FIG. 2, a front-sectional view of the portable device 110 coupled to the apparatus 100 is shown. To show the components to be discussed, a portion of the front of the apparatus 100 has been removed, and only a portion of the portable device 110 is pictured. As can be seen, the contacts 122 of the portable device 110 are electrically coupled to the contacts 118 of the apparatus 100, which can permit charging current to flow to the portable device 110. Additionally, the apparatus 100 can electromagnetically engage the portable device 110. Specifically, the electromagnet 120 can be energized and can attract the magnetically susceptible component 124 of the portable device 110. The term electromagnetically engage can mean the process of using a magnetic field to secure the portable device to the apparatus 100 for purposes of providing a user a tactile indication as to the status of the charging of the portable device 110.

As the portable device 110 is charged towards the predetermined level, the apparatus 100 can eventually electromagnetically decouple the portable device 110. Once electromagnetically decoupled, a user can remove the portable device 110 from the apparatus 100. The term electromagnetically decouple can mean the process of eliminating a magnetic field, whether substantially instantaneously or through a gradual weakening, to permit a user to remove the portable device 110 from the apparatus 100 when the portable device 110 has been charged to a predetermined level.

Figure 3:
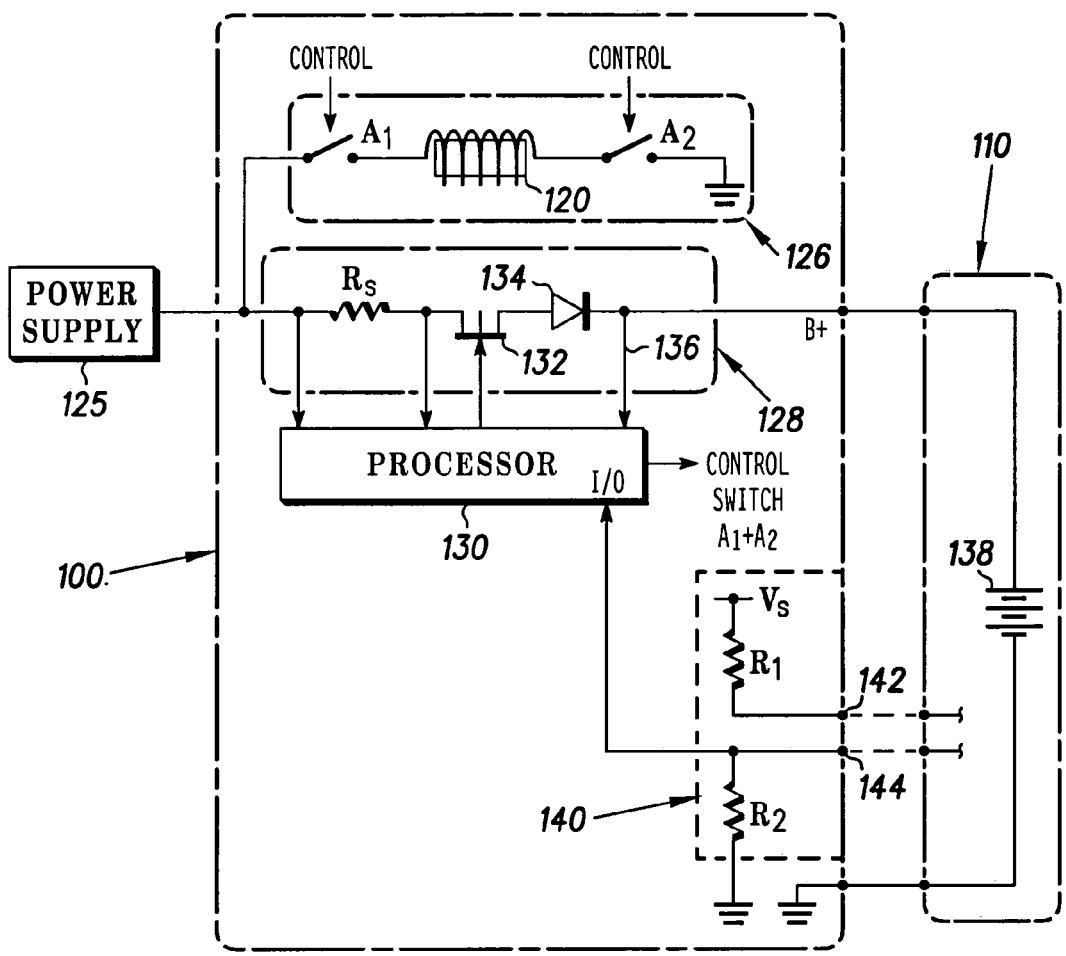
FIG. 3 illustrates a schematic for a charging apparatus and a portable device in accordance with an embodiment of the inventive arrangements.

Referring to FIG. 3, several components of the apparatus 100 and the portable device 110 are shown. A power supply 125 can provide charging current to the apparatus 100. In one arrangement, the apparatus 100 can include an indication circuit 126 having at least one electromagnet 120, a charge control circuit 128 for controlling charging current to the portable device 110 and a processor 130 that can control the operation of both the indication circuit 126 and the charge control circuit 128. The indication circuit 126 can be coupled to the input from the power supply 125 and can include, for example, a switch $A_1$ and a corresponding switch $A_2$, which can be located on opposite sides of the electromagnet 120. It is understood, however, that the invention is not limited to this particular indication circuit 126, as other suitable schemes can be used with the invention.

The electromagnet 120 is shown as being positioned some distance away from the portable device 110, which has been done to produce a diagram that is easier to follow. Nevertheless, FIG. 3 is merely meant to illustrate examples of the circuits that can be implemented in the invention and as such, cannot be used to limit the positioning of the electromagnet 120.

The processor 130 can control the operation of the indication circuit 126 by, for example, manipulating the switches $A_1$ and $A_2$ (note that the actual connections are only partly illustrated to limit confusion when reviewing FIG. 3). By controlling the switches $A_1$ and $A_2$, the processor 130 can direct current through the electromagnet 120, which can cause the electromagnet 120 to generate an attractive magnetic field with respect to the magnetically susceptible component 124 (see FIGS. 1 and 2 of the portable device 110).

The charge control circuit 128 can include, for example, a sense resistor $R_S$, a field effect transistor (FET) 132, a blocking diode 134 and an input 136. As is known in the art, the sense resistor $R_S$, through two inputs, and the input 136 can enable the processor 130 to monitor the charging of the portable device 110. The processor 130 can make adjustments to the amount of charging current flowing to the portable device 110 by controlling the FET 132. The charging current can flow through a B+contact and on to one or more cells 138 of the portable device 110. Although not illustrated, those of ordinary skill in the art will appreciate that the processor 130 can have analog-to-digital (A/D) converters for digitally converting the inputs described above. It is also understood that the invention is not limited to this particular charge control circuit 128, as other suitable schemes can be employed with the invention.

The apparatus 100 can also include a sensor 140. The sensor 140 can include a voltage supply $V_s$, a pull-up resistor $R_1$, a first node 142, a second node 144 and another resistor $R_2$. The sensor 140 has an output that feeds into an input/output (I/O) of the processor 130. The sensor 140 can signal the processor 130 when the portable device 110 is coupled to or removed from the apparatus 100. For example, when the portable device 110 is coupled to the apparatus 100, a circuit can be completed through the first and second nodes 142, 144, which the processor 130 can detect. Similarly, if the portable device 110 is removed from the apparatus 100, the circuit through the first and second nodes 142, 144 is broken, and the processor 130 can identify the change. Again, the invention is not limited to this particular sensor 140, as other suitable schemes can be implemented in the invention.

Figure 4:
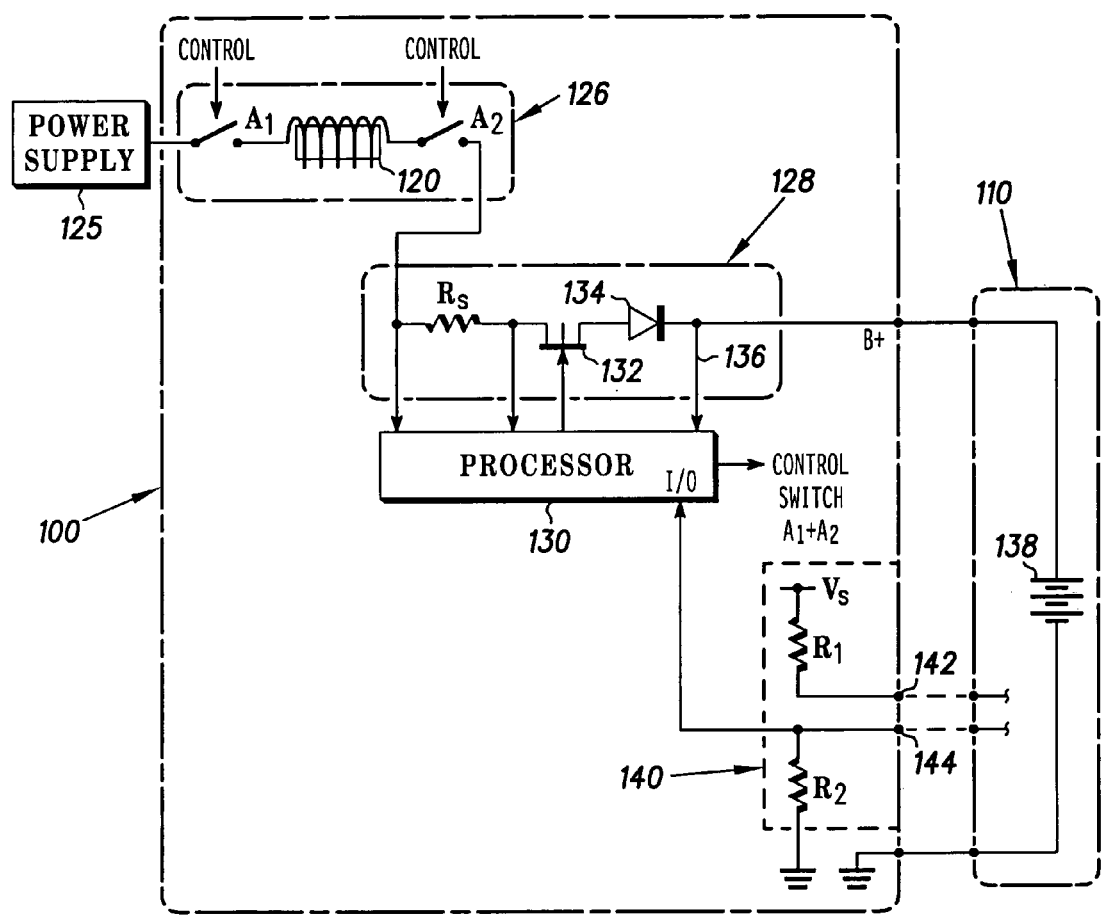
FIG. 4 illustrates another schematic for a charging apparatus and a portable device in accordance with an embodiment of the inventive arrangements.

Referring to FIG. 4, another example of several components of the apparatus 100 and the portable device 110 is shown. The arrangement of the apparatus 100 and the portable device 110 is similar to that shown in FIG. 3. That is, the apparatus in FIG. 4 can have an indication circuit 126, a charge control circuit 128, a sensor 140 and all the components that make up these circuits. The primary difference is that the indication circuit 126 of FIG. 4 is in series with the charge control circuit 128. The indication circuit 126 of FIG. 3 can branch off of or be in parallel with the charge control circuit 128.

Referring back to FIG. 3, when the power supply 125 is supplying charging current to the apparatus 100, current can also be supplied to the indication circuit 126. For example, the processor 130 can close switches $A_1$ and $A_2$, and the indication circuit 126 can provide an engaging current to the electromagnet 120. This process can cause the electromagnet 120 to generate, for example, an attractive magnetic field with respect to the portable device 110. For purposes of the invention, the term engaging current can mean current that is supplied to the electromagnet 120 that causes the electromagnet 120 to generate a magnetic field.

As noted earlier, the apparatus 100 can be used to charge the portable device 110 to a predetermined level, such as a predetermined battery charge capacity. This predetermined level can be a maximum level, such as a maximum battery charge capacity, or something less. When a magnetic field is produced, the generated field can remain at a substantially fixed level as the portable device 110 is charged towards the predetermined level. The reason for the substantially fixed level of the generated field is because the indication circuit 126 is independent of the charge control circuit 128. As is known in the art, as a battery (such as one that can be coupled to the portable device 110) is charged, the amount of charging current that is supplied to the battery may decrease. This decrease in current that may occur in the charge control circuit 128 will not affect the amount of current reaching the indication circuit 126.

Referring to FIG. 4, as the portable device 110 is charged towards the predetermined level, the charging current supplied to the portable device 110 may decrease, as described above. In this arrangement, however, if switches $A_1$ and $A_2$ are closed, the strength of the magnetic field generated by the electromagnet 120 may correspondingly decrease, too. As an example, the magnetic field may be an attractive magnetic field in relation to the portable device 110. As the amount of charging current drops in response to the portable device 110 being charged towards the predetermined level, the strength of the attractive magnetic field can decrease, too. A user can sense the drop in attraction between the apparatus 100 and the portable device 110, which can provide an indication that the portable device is nearing its charge capacity.

Figure 5:
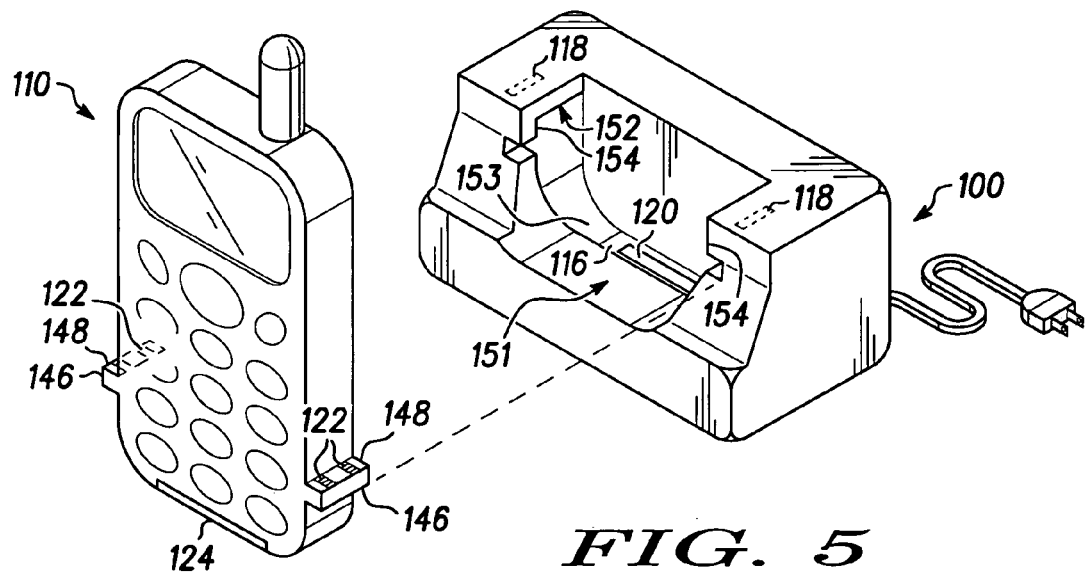
FIG. 5 illustrates another portable device and charging apparatus in accordance with an embodiment of the inventive arrangements.
Figure 6:
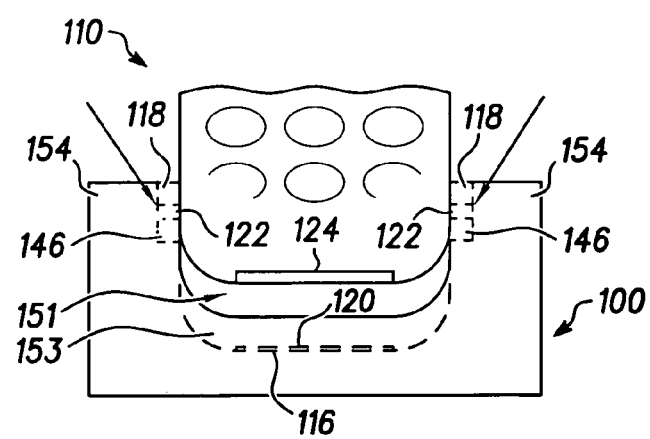
FIG. 6 illustrates a front-sectional view of a portion of the portable device and the charging apparatus of FIG. 5 in which the portable device is coupled to the charging apparatus in accordance with an embodiment of the inventive arrangements.

The apparatus 100 can also be designed to produce a repulsive magnetic field, which can be used to assist in the charging of the portable device 110. An example of such a construction is illustrated in FIGS. 5 and 6. Here, the portable device 110 can include one or more extensions 146 that can include a top surface 148. In one arrangement, the contacts 122 for the portable device 110 can be located on the top surface 148 of the extensions 146. As another example, the magnetically susceptible component 124 can be attached near the bottom of the portable device 110. The magnetically susceptible component 124 can be a magnet that has a like pole with respect to the magnetic field that the electromagnet 120 of the apparatus 100 will generate.

As shown in FIG. 5, the electromagnet 120 can be positioned on a first surface 116 of the apparatus 100. The contacts 118 that correspond to the contacts 122 of the portable device 100 can be located on a second surface 152 of the apparatus 100. The contacts 118, because they are hidden from view, are represented by dashed outlines. In this arrangement, the first surface 116 can be opposed to the second surface 152. The apparatus 100 can also have a front opening 151 for receiving the portable device 110 and a cavity 153 for receiving the portable device 110 when the apparatus 100 electromagnetically decouples the portable device 110. The electromagnet 120 can be positioned within this cavity 153.

Referring to FIG. 6, a front-sectional view of the portable device 110 coupled to the apparatus 100 is shown (only a portion of the portable device 110 is illustrated). The portable device 110 can be coupled to the apparatus 100 by sliding the portable device 110 into the front opening 151 of the apparatus 100. In this example, the electromagnet 120 can generate a magnetic field that repels the magnetically susceptible component 124 of the portable device 110. That is, the magnetically susceptible component 124 can be a magnet that has a like pole as compared to the generated magnetic field. This repulsion can urge the portable device 110 upwards such that the contacts 122 of the portable device 110 are electrically coupled to the contacts 118 of the apparatus 100 to enable charging current to be provided to the portable device 110. In this example, the apparatus 100 has electromagnetically engaged the portable device 110.

In one arrangement, the apparatus 100 can have one or more blocking segments 154 (see also FIG. 5). When the portable device 110 is electromagnetically engaged to the apparatus 100, the blocking segments 154 can impede the forward movement of the extensions 146 of the portable device 110. This obstruction can prevent the removal of the portable device 110 from the apparatus 100 when the electromagnet 120 is generating the repulsive magnetic field. When the repulsive magnetic field is removed or at least substantially weakened, the portable device 110 may drop, which will then permit the extensions 146 to clear the blocking segments 154. At this point, the apparatus 100 has electromagnetically decoupled the portable device 110, and the portable device 110 can be moved forward to allow its removal from the apparatus 100.

Although not shown here, those of ordinary skill in the art will appreciate that structural support features (in addition to or in lieu of the cavity 153) may be added to the portable device 110 and/or the apparatus 100. These support features can help stabilize the portable device 110 as the apparatus 100 electromagnetically engages and decouples the portable device 110. Moreover, it is understood that the invention is in no way limited to the structure illustrated in FIGS. 5 and 6. That is, both the portable device 110 and the apparatus 100 can be constructed in various ways to implement charging of the portable device 110 using a repulsive magnetic field.

To produce the repulsive magnetic field, the components illustrated in FIGS. 3 and 4 can be used. To produce the repulsive force, the magnetically susceptible component 124 of the portable device 110 can be a like pole magnet with respect to the electromagnet 120. In accordance with the discussion relating to FIGS. 3 and 4, the repulsive magnetic field can remain at a substantially fixed level as the portable device 110 is charged towards a predetermined level. Alternatively, the repulsive magnetic field can decrease in strength as the portable device 110 is charged towards a predetermined level.

Figure 7:
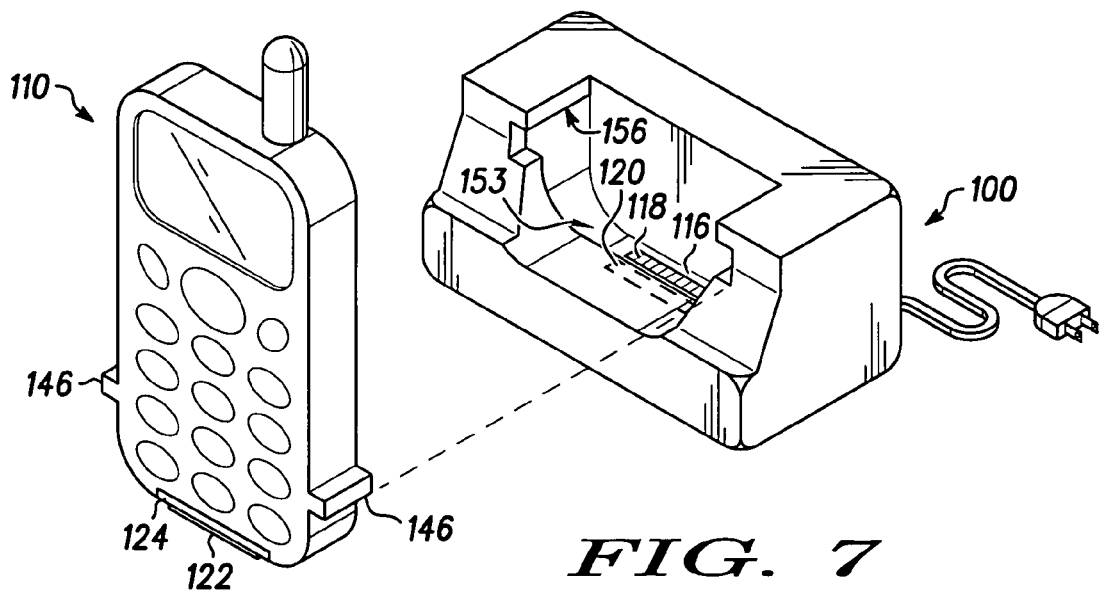
FIG. 7 illustrates yet another portable device and charging apparatus in accordance with an embodiment of the inventive arrangements.

Referring to FIG. 7, another example of a portable device 110 and an apparatus 100 for indication of a charging condition is shown. In this example, the apparatus 100 and the portable device 110 can be somewhat structurally similar to the apparatus 100 and the portable device 110 of FIG. 5. That is, the portable device 110 can have one or more extensions 146 and a magnetically susceptible component 124. Additionally, the apparatus 100 can include a cavity 153 and an electromagnet 120 positioned inside the cavity 153 on the first surface 116. Here, however, the contacts 122 for the portable device 110 can be located at or near the bottom of the portable device 110. Also, the contacts 118 of the apparatus 100 can be positioned on the first surface 116.

In this arrangement, the apparatus 100 can generate an attractive magnetic field, and when the portable device 110 is charged to a predetermined level, the apparatus 100 can generate a repulsive magnetic field. To accomplish such a process, the magnetically susceptible component 124 can be a magnet having a predetermined pole.

Figure 8:
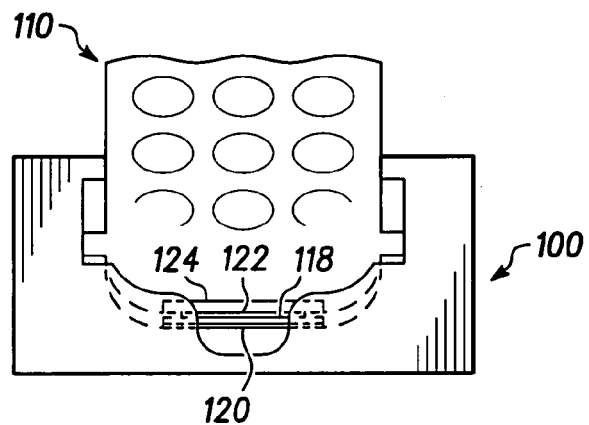
FIG. 8 illustrates a front-sectional view of a portion of the portable device and the charging apparatus of FIG. 7 in which the portable device is coupled to the charging apparatus in a first position in accordance with an embodiment of the inventive arrangements.

Referring to FIG. 8, the apparatus 100 can electromagnetically engage the portable device 110 in a first position in which the electromagnet 120 is generating an attractive magnetic field with respect to the magnetically susceptible component 124. Only a portion of the portable device 110 is shown here, and part of the apparatus 100 has been removed to show more clearly some of the components. The contacts 118 of the apparatus 100 can be electrically coupled to the contacts 122 of the portable device 110, thereby allowing charging current to flow to the portable device 110.

Figure 9:
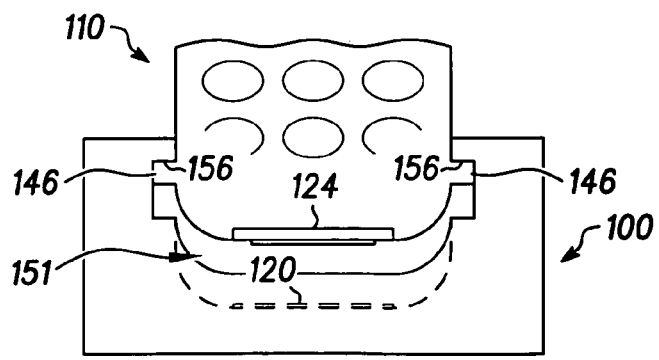
FIG. 9 illustrates a front-sectional view of a portion of the portable device and the charging apparatus of FIG. 7 in which the portable device is coupled to the charging apparatus in a second position in accordance with an embodiment of the inventive arrangements.

Referring to FIG. 9, the apparatus 100 can electromagnetically engage the portable device 110 in a second position. This process can occur when the portable device 110 has been charged to a predetermined level or capacity. When the portable device 110 is in the second position, a user is given an indication that the portable device 110 is fully charged. To urge the portable device 110 in the second position, the electromagnet 120 can generate a repulsive magnetic field with respect to the magnetically susceptible component 124.

In this arrangement, the projections 146 can rest against an inner surface 156 of the apparatus 100 to help keep the portable device 110 in place when the repulsive magnetic field is being generated. In this second position, the contacts 118 and the contacts 122 are no longer electrically coupled, and the flow of charging current to the portable device 110 can stop. In addition, the portable device 110 can be easily removed from the apparatus 100 by moving it forward through an opening 151 of the apparatus 100.

While not shown here, those of ordinary skill in the art will appreciate that structure for supporting the portable device 110, in addition to the cavity 153, can be incorporated in the portable device 110 and/or the apparatus 100. The supporting structure can support the portable device 110 in both the first and second positions. Moreover, it is understood that the invention is not limited to the portable device 110 and the apparatus 100 shown in FIGS. 7–9, as other suitable designs are within contemplation of the inventive arrangements. Those of skill in the art will also appreciate that the apparatus 100 could be designed to generate a repulsive magnetic field during the charging phase and an attractive magnetic field once the portable device 110 has been charged to the predetermined level as an alternative to the process explained above.

Figure 10:
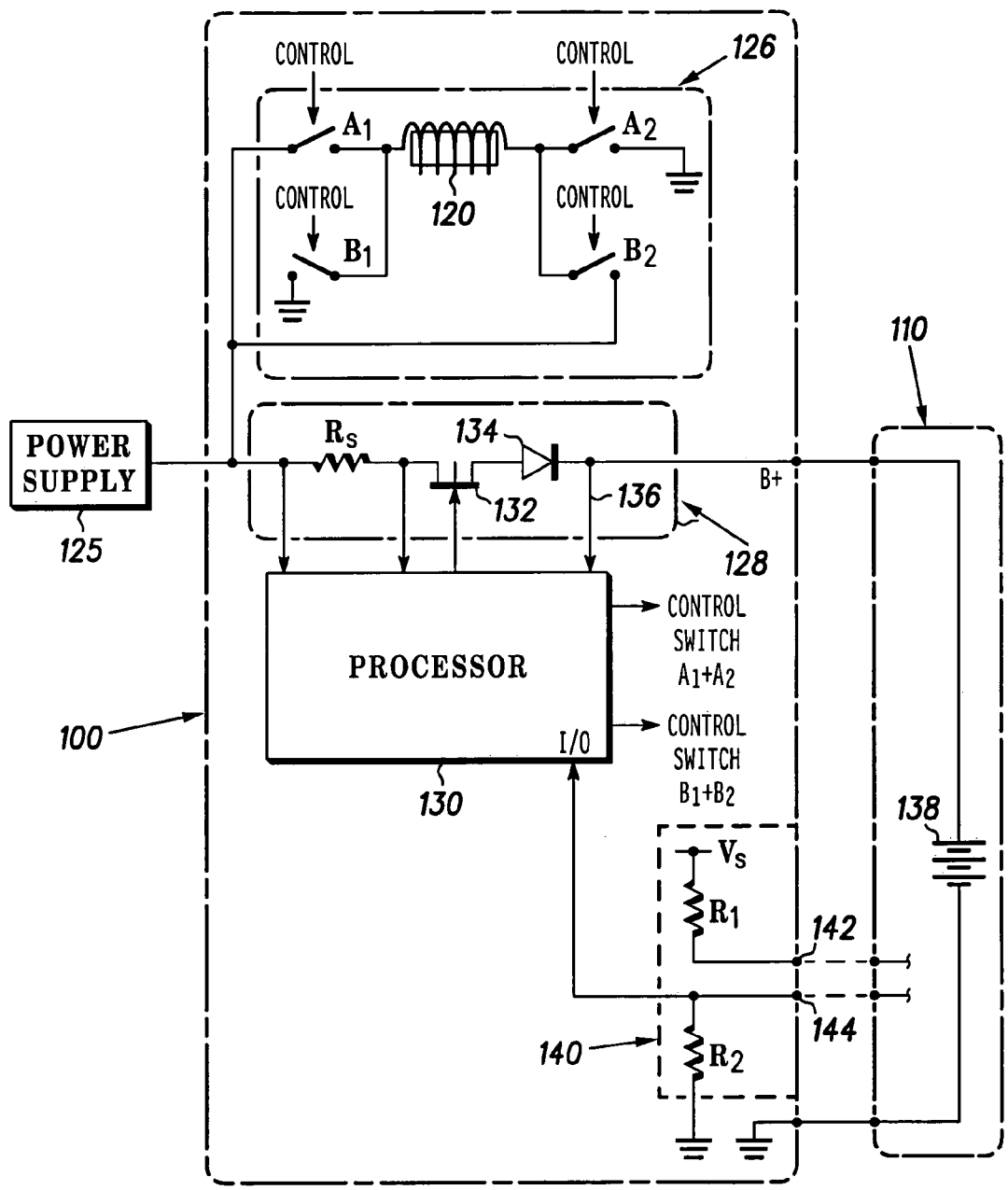
FIG. 10 illustrates another schematic for a charging apparatus and a portable device in accordance with an embodiment of the inventive arrangements.

Referring to FIG. 10, a circuit for carrying out the process described in relation to FIGS. 7–9 is shown. This circuit can be like the one presented in FIG. 3. The indication circuit 126 in FIG. 10 can be different in that it can contain two sets of switches, $A_1$, $A_2$, $B_1$ and $B_2$. The switches $A_1$ and $A_2$ can be located on opposite sides of the electromagnet 120. Similarly, the switches $B_1$ and $B_2$ can be positioned on opposite sides of the electromagnet 120. The switches $A_1$, $A_2$, $B_1$ and $B_2$ can be under the control of the processor 130.

To generate the attractive magnetic field, the processor can close the switches $A_1$ and $A_2$ (keeping the switches $B_1$ and $B_2$ open), which can provide an engaging current to the electromagnet 120 and as described earlier in relation to FIG. 3. To generate the repulsive magnetic field, the processor 130 can close the switches $B_1$ and $B_2$ (keeping the switches $A_1$ and $A_2$ open). This step can cause current to flow in a direction opposite to the flow of current when the switches $A_1$ and $A_2$ are closed. The processor 130 can open the switches $A_1$ and $A_2$ and close the switches $B_1$ and $B_2$ when the portable device 110 has been charged to a predetermined level.

Figure 11:
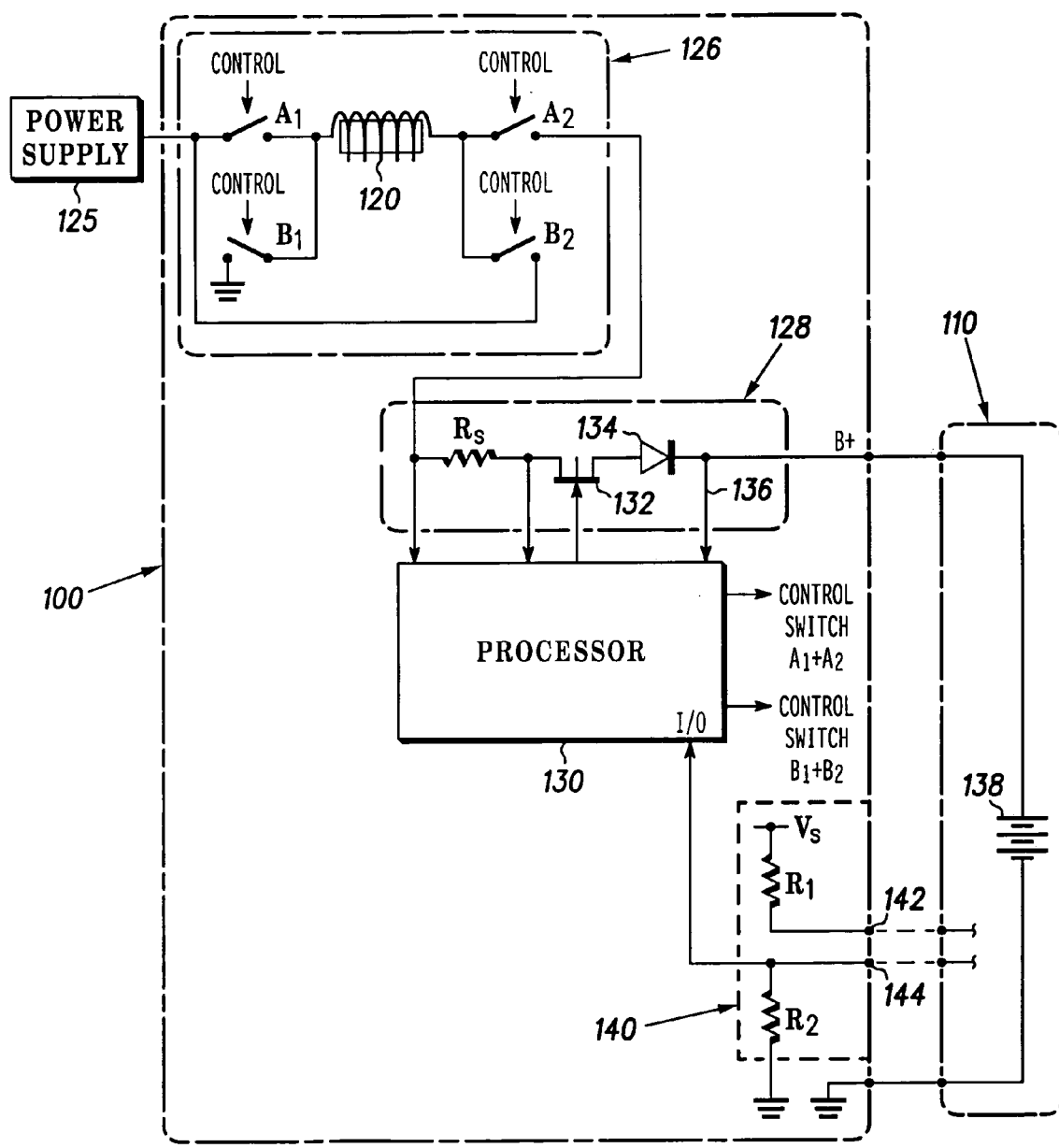
FIG. 11 illustrates yet another schematic for a charging apparatus and a portable device in accordance with an embodiment of the inventive arrangements.

Referring to FIG. 11, another circuit for carrying out the process described in relation to FIGS. 7–9 is shown. This circuit can be like the one presented in FIG. 4. For example, at least part of the indication circuit 126 can be in series with the charge control circuit 128, particularly the electromagnet 120 and the switches $A_1$ and $A_2$. In this arrangement, the attractive magnetic field that the electromagnet 120 generates can decrease as the level of charging current that flows to the portable device 110 decreases.

Once the portable device 110 has been charged to the predetermined level and the charging current to it has been removed, the indication circuit 126 may still supply an engaging current to the electromagnet 120 to permit it to generate the repulsive magnetic field. To do so, part of the indication control circuit 126 may branch off of or be in parallel with the charge control circuit 128. For example, the switches $B_1$ and $B_2$ can be used to direct current in an opposite direction to that provided by the switches $A_1$ and $A_2$ with the switch $B_1$ coupled to ground. This part of the indication circuit 126 can be independent of the charge control circuit 128, thereby allowing the strength of the repulsive magnetic field to stay at a substantially fixed level.

To carry out the processes described in relation to FIGS. 7–9, it is understood that the invention is in no way limited to the components shown in FIGS. 10 and 11. For example, other suitable indication circuits and charge control circuits can be used to practice the invention. Those of ordinary skill in the art will also appreciate that the invention can be designed such that the portable device 110 is initially repelled to a first position by the electromagnet 120 and then charged while in this first position (similar to the process described in relation to FIGS. 5 and 6). Once the portable device is charged, the electromagnet 120 can then generate an attractive magnetic field, and the portable device 110 can move into a second position in the apparatus 100. By moving into the second position, a user can be given an indication that the portable device 110 has been charged. The attractive magnetic field can be relatively weak to permit a user to easily remove the portable device 110 from the apparatus 100.

Figure 12:
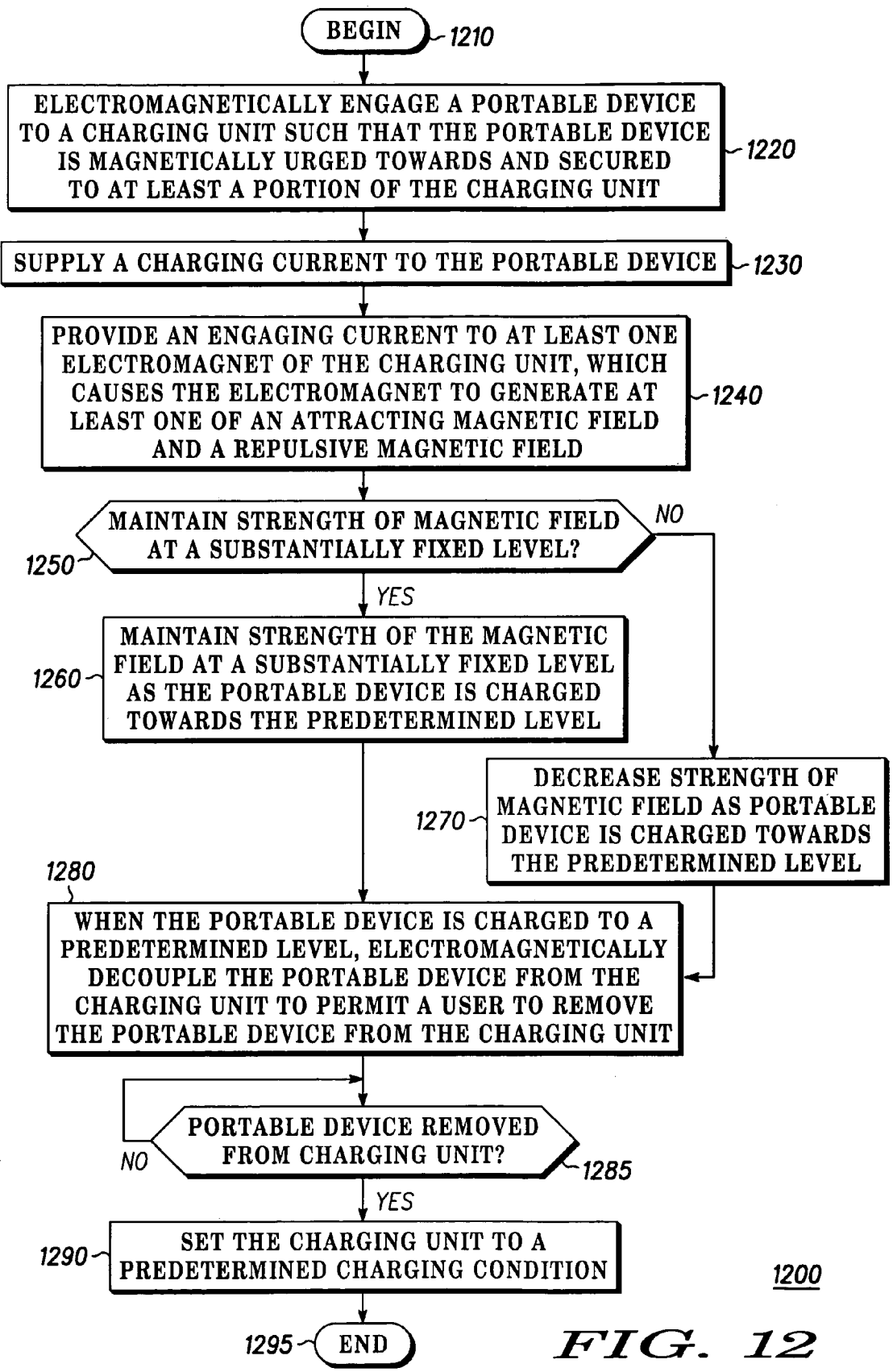
FIG. 12 illustrates a method for indication of a charging condition in accordance with an embodiment of the inventive arrangements.

Referring to FIG. 12, a method 1200 for indication of a charging condition is illustrated. To describe the method 1200, reference may be made to FIGS. 1-6, although it must be noted that the method 1200 can be practiced in other suitable systems. At step 1210, the method 1200 can begin. As shown at step 1220, a charging unit can electromagnetically engage a portable device such that the portable device is magnetically urged towards and secured to at least a portion of the charging unit. At step 1230, a charging current can be supplied to the portable device. In addition, at step 1240, an engaging current can be provided to at least one electromagnet of the charging unit, which can cause the electromagnet to generate either an attractive magnetic field or a repulsive magnetic field with respect to the portable device.

For example, referring to FIGS. 1–6, the switches $A_1$ and $A_2$ can be closed, and an engaging current can be supplied to the electromagnet 120 of the apparatus 100. The electromagnet 120 can then generate either an attractive magnetic field or a repulsive magnetic field with respect to the portable device 110. Depending on the type of field generated, the apparatus 100 can magnetically urge the portable device 110 towards a portion of the apparatus 100. The portable device 110 can also be secured to this portion of the apparatus 100. Examples include the arrangements shown in FIGS. 2 and 6. At this point, the apparatus 100, through the charge control circuit 128, can provide charging current to the portable device 110.

Referring back to the method 1200 of FIG. 12, at decision block 1250, it can be determined whether the strength of the magnetic field will be maintained at a substantially fixed level or decreased. If it will be a substantially fixed level, at step 1260, the strength of the magnetic field can be maintained at the substantially fixed level as the portable device is charged towards the predetermined level. If it will be decreased, at step 1270, the strength of the magnetic field can be decreased as the portable device is charged towards the predetermined level.

For example, if it is desired to keep the strength of the magnetic field (whether attractive or repulsive) at a substantially fixed level as the portable device 110 is being charged to the predetermined level, the configuration of the indication circuit 126 as pictured in FIG. 3 is suitable. Conversely, if it desired to decrease the strength of the magnetic field (whether attractive or repulsive) as the portable device 110 is charged to the predetermined level, the indication circuit 126 as shown in FIG. 4 can be useful.

Referring back to FIG. 12, at step 1280, when the portable device is charged to a predetermined level, the portable device can be electromagnetically decoupled from the charging unit to permit a user to remove the portable device from the charging unit. For example, referring to FIGS. 1–6, when the portable device 110 has been charged to a predetermined level, the apparatus 100 can electromagnetically decouple the portable device 110. Specifically referring to FIGS. 3 and 4, when the portable device 110 has been charged to the predetermined level, the switches $A_1$ and $A_2$ can be opened, which will stop the flow of the engaging current to the electromagnet 120. The removal of this current can cause the generated magnetic field to collapse, which can allow the portable device 110 to be removed from the apparatus 100.

In one arrangement, the predetermined level can be a maximum battery charge capacity for a battery that will supply power to the portable device 110. The predetermined level, however, may also be a charge capacity that is below the maximum battery charge capacity.

Moving back to FIG. 12, at decision block 1285, it can be determined whether the portable device has been removed from the charging unit. If it has, the charging unit can be set to a predetermined charging configuration, as shown at step 1290. If the portable device has not yet been removed, the method 1200 can resume at the decision block 1285. Following step 1290, the method 1200 can end at step 1295.

An example of the setting step 1290 will be presented. Referring to FIGS. 3 and 4 and as noted earlier, when the portable device 110 is charged to the predetermined level, the switches $A_1$ and $A_2$ can open, which eliminates the magnetic field. When a user removes the portable device 110, the circuit created between the first and second nodes 142 and 144 of the sensor 140 is broken. This break in the circuit can be signaled to the processor 130. In response, the processor 130 can set the switches $A_1$ and $A_2$ to a predetermined configuration, such as closing both of them. By closing the switches $A_1$ and $A_2$, the apparatus 100 can be made ready to receive the portable device 110 once again. As an option, a time delay can be programmed into the processor 130 to ensure that the switches $A_1$ and $A_2$ are not set too soon. Setting the switches $A_1$ and $A_2$ too soon may interfere with the user removing the portable device 110 from the apparatus 100.

It must be noted, however, that the invention is not limited to this particular setting configuration, as other suitable configurations are contemplated by the inventive arrangements. This principle is particularly applicable because the invention is not limited to the indication circuit 126 of FIGS. 3 and 4. Moreover, the invention is not limited to the sensor 140 as depicted in these drawings, as virtually any other means for detecting when the portable device 110 has been removed from the apparatus 100 can be employed.

Figure 13:
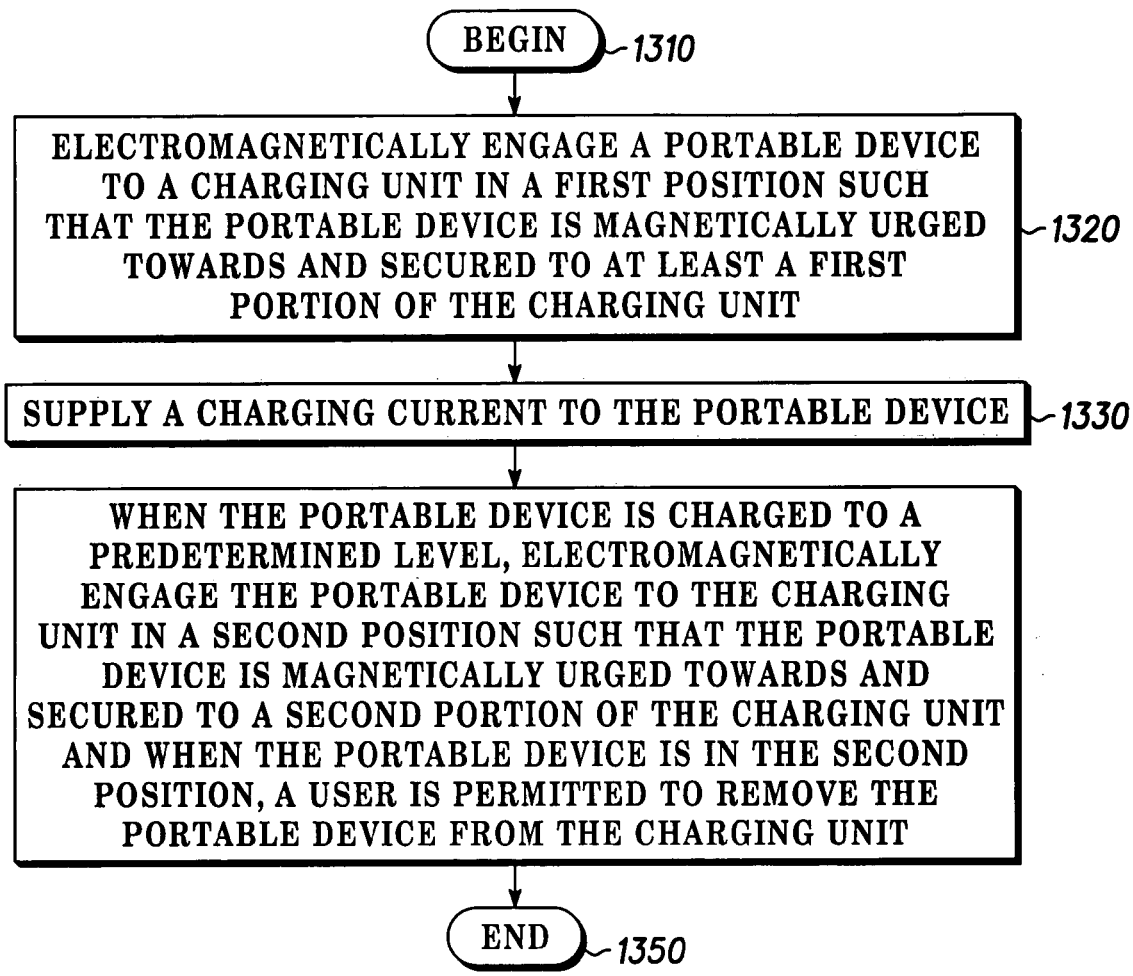
FIG. 13 illustrates another method for indication of a charging condition in accordance with an embodiment of the inventive arrangements.

Referring to FIG. 13, another method 1300 for indication of a charging condition is illustrated. The method 1300 is somewhat similar to the method 1200, although reference will be made to FIGS. 7–11 when describing the method 1300. It is understood that the method 1300 can be practiced in other suitable systems, though. At step 1310, the method can begin. At step 1320, a charging unit can electromagnetically engage a portable device in a first position such that the portable device is magnetically urged towards and secured to at least a first portion of the charging unit. For example, the apparatus 100 can electromagnetically engage the portable device 110 in a first position, an example of which is shown in FIG. 8. As noted earlier, in this case, the electromagnet 120 can generate an attractive magnetic field with respect to the magnetically susceptible component 124 of the portable device 110. Referring to FIGS. 10 and 11, the processor 130 can close the switches $A_1$ and $A_2$ and can open the switches $B_1$ and $B_2$.

Moving back to the method 1300 of FIG. 13, charging current can then be supplied to the portable device, as shown at step 1330. For example, referring to FIGS. 10 and 11 again, the apparatus 100, through the charge control circuit 128, can provide charging current to the portable device 110. At step 1340 of FIG. 13, when the portable device is charged to a predetermined level, the charging unit can electromagnetically engage the portable device in a second position such that the portable device is magnetically urged towards and secured to a second portion of the charging unit. When the portable device is in the second position, the charging current can be stopped, and a user can be permitted to remove the portable device from the charging unit. The method can end at step 1350.

For example, once the portable device 110 is charged to the predetermined level, the apparatus 100 can electromagnetically engage the portable device in a second position, an example of which is shown in FIG. 9. In this case, the electromagnet 120 can generate a repulsive magnetic field with respect to the magnetically susceptible component 124 of the portable device 110. Referring to FIGS. 10 and 11, the processor 130 can open the switches $A_1$ and $A_2$ and can close the switches $B_1$ and $B_2$. When the portable device 110 is in the second position, the user can them remove the portable device 110 from the apparatus 100.

Similar to the method 1200, when the portable device 110 is removed, the apparatus 100 can detect the removal and can be set to a predetermined charging configuration. For example, once the processor 130 detects the removal (through the sensor 140), the processor 130 can open the switches $B_1$ and $B_2$ and can close the switches $A_1$ and $A_2$. The apparatus 100 can once again receive the portable device 110 for charging.

It must be noted, however, that the method 1300 is not limited to the process described above. For example, the portable device 110 can be repelled in the first position with a repulsive magnetic field during the charging phase. Further, the portable device 110 can be attracted to the second position with an attractive magnetic field once the portable device 110 is charged to the predetermined level.

In addition, while the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus for indication of a charging condition, comprising:
   an indication circuit having at least one electromagnet; and
   a charge control circuit for controlling charging current to a power supply of a portable device;
   wherein the indication circuit causes the apparatus to electromagnetically engage the portable device and the charge control circuit provides charging current to the power supply of the portable device during the engagement and wherein the indication circuit causes the apparatus to electromagnetically decouple the portable device when the power supply of the portable device is charged to a predetermined level to permit a user to remove the portable device from the apparatus.

2. The apparatus according to claim 1, wherein the apparatus further comprises at least one contact and wherein the apparatus contact electrically couples to a contact of the portable device when the apparatus electromagnetically engages the portable device.

3. The apparatus according to claim 1, wherein the indication circuit provides an engaging current to the electromagnet, wherein the engaging current causes the electromagnet to generate an attractive magnetic field or a repulsive magnetic field.

4. The apparatus according to claim 3, wherein when the electromagnet generates an attractive magnetic field, the electromagnet attracts a non-magnetized, metallic component of the portable device or an opposite pole magnet of the portable device.

5. The apparatus according to claim 3, wherein when the electromagnet generates a repulsive magnetic field, the electromagnet repels a like pole magnet of the portable device.

6. The apparatus according to claim 2, wherein the electromagnet and the contacts are positioned on a first surface of the apparatus.

7. The apparatus according to claim 2, wherein the electromagnet is positioned on a first surface of the apparatus and the contacts are positioned on a second surface of the apparatus, wherein the second surface opposes the first surface.

8. The apparatus according to claim 1, wherein the electromagnet generates a magnetic field when the apparatus electromagnetically engages the portable device and the magnetic field decreases in strength as the power supply of the portable device is charged towards the predetermined level.

9. The apparatus according to claim 8, wherein the indication circuit and the charge control circuit are in series.

10. The apparatus according to claim 1, wherein the electromagnet generates a magnetic field when the apparatus electromagnetically engages the portable device and the magnetic field remains at a substantially fixed level as the power supply of the portable device is charged towards the predetermined level.

11. The apparatus according to claim 10, wherein the indication circuit and the charge control circuit are in parallel.

12. The apparatus according to claim 1, wherein the apparatus further comprises a sensor for determining whether the portable device has been removed from the apparatus.

13. An apparatus for indication of a charging condition, comprising:
    an indication circuit having at least one electromagnet; and
    a charge control circuit for controlling charging current to a power supply of a portable device;
    wherein the indication circuit causes the apparatus to electromagnetically engage the portable device in a first position and the charge control circuit provides charging current to the power supply of the portable device during the first position engagement and wherein the indication circuit causes the apparatus to electromagnetically engage the portable device in a second position when the power supply of the portable device is charged to a predetermined level such that a user is permitted to remove the portable device from the apparatus.

14. A portable device, comprising:
    a power supply;
    at least one contact for electrically coupling to at least one corresponding contact on a charging unit; and
    a magnetically susceptible component;
    wherein the charging unit electromagnetically engages the magnetically susceptible component and provides a charging current to the power supply of the portable device through the contacts of the portable device and the corresponding contacts of the charging unit during the engagement;
    wherein the charging unit electromagnetically decouples the portable device when the power supply of the portable device is charged to a predetermined level to permit a user to remove the portable device from the charging unit.

15. The portable device according to claim 14, wherein the magnetically susceptible component is a non-magnetized, metallic component or a magnet.

16. The portable device according to claim 15, wherein the magnet of the portable device is a like pole magnet with respect to an electromagnet in the charging unit such that the electromagnet generates a repulsive magnetic field when the charging unit electromagnetically engages the portable device.

17. A method for indication of a charging condition, comprising the steps of:
   electromagnetically engaging a portable device to a charging unit such that the portable device is magnetically urged towards and secured to at least a portion of the charging unit;
   supplying charging current to a power supply of the portable device; and
   when the power supply of the portable device is charged to a predetermined level, electromagnetically decoupling the portable device from the charging unit to permit a user to remove the portable device from the charging unit.

18. The method according to claim 17, further comprising the steps of:
   providing an engaging current to at least one electromagnet of the charging unit, wherein the providing an engaging current step causes the electromagnet to generate an attractive magnetic field or a repulsive magnetic field.

19. The method according to claim 17, wherein the charging unit has at least one electromagnet and the method further comprises the steps of:
   generating a magnetic field during the electromagnetically engaging step; and
   decreasing the strength of the magnetic field as the power supply of the portable device is charged towards the predetermined level.

20. The method according to claim 17, wherein the charging unit has at least one electromagnet and the method further comprises the steps of:
   generating a magnetic field during the electromagnetically engaging step; and
   keeping the strength of the magnetic field at a substantially constant level as the power supply of the portable device is charged towards the predetermined level.

21. The method according to claim 17, further comprising the steps of:
   determining whether the portable device has been removed from the charging unit; and
   in response to the portable device being removed from the charging unit, setting the charging unit to a predetermined charging configuration.

22. The method according to claim 17, wherein the electromagnetically engaging step comprises magnetically urging and securing the portable device to the charging unit with an attractive magnetic field and the electromagnetically decoupling step comprises removing the attractive magnetic field.

23. The method according to claim 17, wherein the electromagnetically engaging step comprises magnetically urging and securing the portable device to the charging unit with a repulsive magnetic field and the electromagnetically decoupling step comprises removing the repulsive magnetic field.

24. A method for indication of a charging condition, comprising the steps of:
   electromagnetically engaging a portable device to a charging Unit in a first position such that the portable device is magnetically urged towards and secured to at least a first portion of the charging unit;
   supplying charging current to a power supply of the portable device; and
   when the power supply of the portable device is charged to a predetermined level, electromagnetically engaging the portable device to the charging unit in a second position such that the portable device is magnetically urged towards and secured to a second portion of the charging unit, wherein when the portable device is in the second position, a user is permitted to remove the portable device from the charging unit.

* * * * *